United States Patent
Wisdom et al.

(10) Patent No.: US 7,216,675 B2
(45) Date of Patent: May 15, 2007

(54) HIGHLY KINK-RESISTANT CORRUGATED TUBING

(75) Inventors: Jack L. Wisdom, Black Mountain, NC (US); Scott M. Roberts, Asheville, NC (US)

(73) Assignee: Crane Resistoflex, Marion, NC (US)

( * ) Notice: Subject to any disclaimer, the term of this patent is extended or adjusted under 35 U.S.C. 154(b) by 0 days.

(21) Appl. No.: 11/022,307

(22) Filed: Dec. 27, 2004

(65) Prior Publication Data

US 2005/0161101 A1    Jul. 28, 2005

Related U.S. Application Data

(60) Provisional application No. 60/533,265, filed on Dec. 31, 2003.

(51) Int. Cl.
*F16L 11/00* (2006.01)
(52) U.S. Cl. ............. 138/133; 138/132; 138/121; 138/122; 138/174
(58) Field of Classification Search ......... 138/121, 138/122, 172, 173, 174, 133, 132

See application file for complete search history.

(56) References Cited

U.S. PATENT DOCUMENTS

| | | | | | |
|---|---|---|---|---|---|
| 1,052,106 | A | * | 2/1913 | Voorhees | 138/127 |
| 2,713,381 | A | * | 7/1955 | Seck | 29/453 |
| 2,830,622 | A | * | 4/1958 | Roberts et al. | 138/121 |
| 3,076,737 | A | * | 2/1963 | Roberts | 156/144 |
| 4,196,031 | A | * | 4/1980 | Lalikos et al. | 156/143 |
| 4,342,612 | A | * | 8/1982 | Lalikos et al. | 156/143 |
| 4,998,564 | A | * | 3/1991 | Igarashi et al. | 138/126 |
| 6,563,045 | B2 | * | 5/2003 | Goett et al. | 174/36 |
| 6,656,552 | B1 | * | 12/2003 | Crouse | 428/36.91 |

* cited by examiner

*Primary Examiner*—Patrick F. Brinson
(74) *Attorney, Agent, or Firm*—Fitzpatrick, Cella, Harper & Scinto

(57) ABSTRACT

A tubing includes an inner liner composed of one or more fluoropolymers, the inner liner being corrugated to define a trough, and having a wire disposed in said trough. The tubing further includes an outer layer, permanently secured to an exterior of the inner liner and covering said wire.

17 Claims, 1 Drawing Sheet

HIGHLY KINK-RESISTANT CORRUGATED TUBING

CROSS-REFERENCE TO RELATED APPLICATION

This application claims the benefit of priority based on U.S. provisional application No. 60/533,265, filed Dec. 31, 2003, which is hereby incorporated by reference herein in its entirey, as if fully set forth herein.

BACKGROUND OF THE INVENTION

1. Field of the Invention

The present invention relates generally to the field of tubing, and more specifically to the field of tubing of types that are highly resistant to kinking.

2. Related Art

Conventional tubing typically has an inner liner in corrugated or convoluted form, with an outer layer of rubber on the exterior of the convolutions. Such structures are good for their intended purposes, but it would be desirable to have such a tubing with improved kink resistance, and that would have improved ability to retain its shape (i.e., not flatten) when subjected to a vacuum.

Structures are known in which a corrugated or convoluted polymer tubing is provided on its outside with a wire wrapped into the troughs of the convolutions. This has typically been done, however, with no outer layer covering the wire.

SUMMARY OF THE INVENTION

It is an object of the present invention to provide a tubing that has improved resistance to kinking and that will largely retain its shape when subjected to a vacuum.

It is a further object of this invention to provide such a tubing that is simple in structure and relatively inexpensive to manufacture.

According to the present invention, these objects are attained in a tubing that has an inner corrugated or corrugated fluoropolymer liner, with a wire lying in the trough of the convolutions, and with an outer layer of EDPM rubber or other suitable material molded to the exterior of the convolutions.

DETAILED DESCRIPTION OF THE PREFERRED EMBODIMENT

Figure 1:
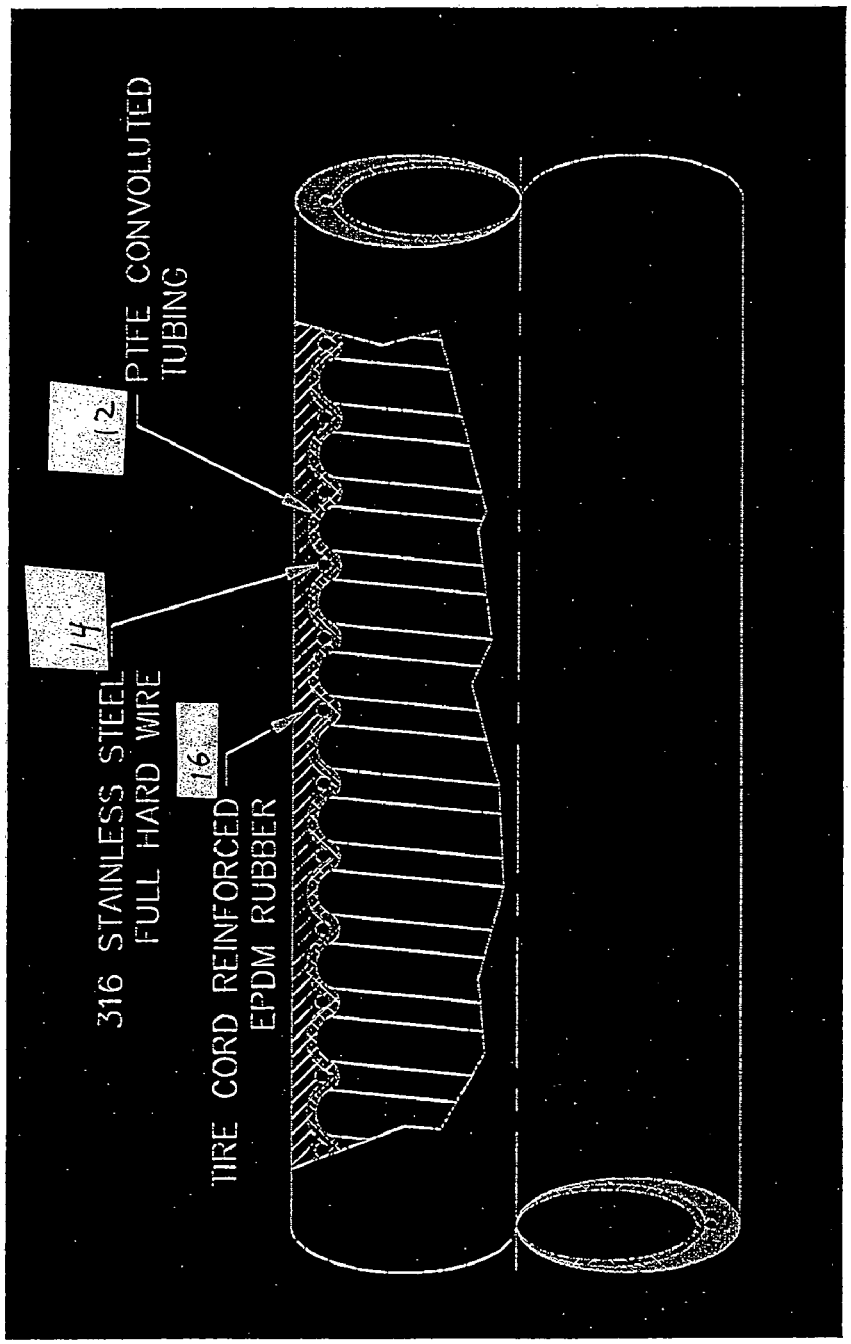
FIG. 1 is a view, partly in section, showing the preferred embodiment of the invention.

As shown in FIG. 1, the preferred embodiment of the tubing 10 is constructed of an inner fluoropolymer liner 12, having a corrugated or convoluted shape. The liner 12 is preferably PTFE tubing. In the illustrated embodiment, both the inside and the outside of the liner are corrugated. A single metal wire 14, preferably stainless steel, lies on the floor of the convolutions, and an outer layer 16, preferably tire cord reinforced EDPM rubber, is molded onto the outer surface of the liner 12, covering the wire 14. The outer surface of the rubber outer layer is smooth in this embodiment.

The corrugated liner 12 is shown as having the width of the floor of the outside trough, in which the wire 14 is placed, narrower than the width of the concave portion of the inner surface of the liner 12. This shape can be varied without departing from the scope of the invention.

The wire 14 strengthens the tubing, and has been found by the inventors to provide a degree of improved kink-resistance, and of resistance to vacuum, that greatly exceeded all expectations. (Multiple wires can be used if preferred, and other materials as well.) The wire 14 can if desired be used as an electrical conductor, in addition to having the benefit of the improvement in the kink-resistance and resistance to vacuum.

In FIG. 1, the appearance of two parallel passages merely reflects a drafting convention; the embodiment actually has only one passage. Nonetheless, while the present invention is particularly contemplated for use in a single-passage tubing, multi-passage tubing is not excluded from the broad scope of the invention.

In addition, various materials can be used in place of those mentioned, and the dimensions can be varied from those shown in FIG. 1 (nonetheless, the proportions actually illustrated in FIG. 1 should, for purposes of this disclosure, be considered as being exact—that is, while the invention is not by any means limited to the precise shapes and sizes shown for the corrugations, wire size, thickness of liner and outer layer, etc., FIG. 1 is presented as a disclosure of the exact proportions illustrated).

Again, while the preferred materials are indicated, others can be substituted in many ways, as will be readily apparent to those skilled in the art.

Techniques for manufacturing this tubing are within the ordinary level of skill in the relevant art, and therefore will not be described.

While the foregoing provides an example of structure embodying the present invention, many modifications and variations of that structure will be apparent to those skilled in the art, and accordingly the scope of the invention is not limited by the details shown or described herein.

What is claimed is:

1. A tubing, comprising:
   an inner liner composed of one or more fluoropolymers, said inner liner being corrugated to define a trough, and having a wire disposed on a floor of said trough; and
   an outer layer, molded on an exterior of said inner liner and covering said wire.

2. The tubing as set forth in claim 1, wherein said inner liner has an inner surface corrugated to define a spiral concave portion, said trough being narrower than said concave portion.

3. The tubing as set forth in claim 1, wherein said inner liner is composed of PTFE.

4. The tubing as set forth in claim 1, wherein said outer layer is composed of EDPM rubber.

5. The tubing as set forth in claim 4, wherein said outer layer is smooth.

6. The tubing as set forth in claim 1, wherein said wire is stainless steel.

7. A tubing, comprising:
   an inner liner composed of a fluoropolymer, said inner liner being corrugated to define a trough, and having a wire disposed on a floor of said trough; and
   an outer layer composed of EDPM rubber and molded on an exterior of said inner liner, said outer layer covering said wire,
   wherein said inner layer has an inner surface corrugated to define a spiral concave portion, said trough being narrower than said concave portion.

8. The tubing as set forth in claim 7, wherein said fluoropolymer is composed of PTFE.

9. The tubing as set forth in claim 7, wherein said outer layer is smooth.

10. The tubing as set forth in claim 7, wherein said wire is stainless steel.

11. A method of manufacturing a tubing, comprising the steps of:
providing an inner liner composed of one or more fluoropolymers, the inner liner being corrugated to define a trough, and having a wire disposed on a floor of said trough; and
providing an outer layer, molded on an exterior of said inner liner and covering said wire.

12. The method as set forth in claim 11, wherein said inner liner has an inner surface corrugated to define a spiral concave portion, said trough being narrower than said concave portion.

13. The method as set forth in claim 11, wherein said inner liner is composed of PTFE.

14. The method as set forth in claim 11, wherein said outer layer is composed of EDPM rubber.

15. The method as set forth in claim 11, wherein said outer layer is smooth.

16. The method as set forth in claim 11, wherein said wire is stainless steel.

17. A tubing, comprising:
an inner liner composed of one or more fluoropolymers, said inner liner being corrugated to define a trough, and having a wire disposed on a floor of said trough; and
an outer layer, permanently secured to an exterior of said inner liner and covering said wire.

* * * * *